United States Patent Office 3,288,740
Patented Nov. 29, 1966

3,288,740
PROCESS FOR THE PREPARATION OF STABLE EMULSIONS FROM N-METHYLOL SUBSTITUTED AMIDES OF ACRYLIC ACID OR THE ETHERS OF SUCH N-METHYLOLAMIDES
Arthur Maeder, Therwil, and Hermann Nachbur, Riehen, Switzerland, assignors to Ciba Limited, Basel, Switzerland, a Swiss company
No Drawing. Filed July 3, 1963, Ser. No. 292,713
Claims priority, application Switzerland, July 5, 1962, 8,062/62
19 Claims. (Cl. 260—29.6)

It is known to manufacture aqueous emulsion polymers from N-methylol-substituted amides of the acrylic acid series or from their ethers obtained by etherifying the methylol group. By virtue of the readily reacting methylol grouping present in them the N-methylol compounds are delicate substances so that the manufacture of emulsion polymers that are not cross-linked and stable involves special difficulties. Especially in the case of copolymers of N-methylol-acrylamides with monomers having slightly acidic properties, such as vinylidene chloride or vinyl acetate, a premature cross-linking of the N-methylol or N-methylol ether groups frequently occurs in the course of the polymerisation; the resulting products are copolymers in which the methylol or methylol ether groups have already undergone cross-linking. Such cross-linked copolymers are formed directly when the polymerisation is conducted under strongly acid conditions. It has been attempted to manufacture stable dispersions or emulsions by incorporating in the polymer monomers containing hydrophilic groups, for example acrylic acid. It was, however, found that with the use of this expedient it was not possible to manufacture products capable of satisfying high demands as to their stability, that is to say when the final emulsion polymer must be storable at 60° C.

It has now been found that it is surprisingly possible to prepare stable emulsion polymers of the aforementioned methylolamides by using in the manufacture of the copolymers a minor proportion of a water-soluble alkaline earth metal salt of an $\alpha:\beta$-ethylenically unsaturated monocarboxylic acid.

The present invention provides a process for the manufacture of stable copolymers of N-methylol-substituted amides of an $\alpha:\beta$-ethylenically unsaturated monocarboxylic or dicarboxylic acid, or of an ether of such a methylolamide, by emulsion polymerisation of the monomers in an aqueous medium, wherein the polymerisation is performed in the presence of a minor proportion of a water-soluble alkaline earth metal salt of an $\alpha:\beta$-ethenically unsaturated monocarboxylic acid.

The $\alpha:\beta$-ethylenically unsaturated monocarboxylic or dicarboxylic acids from which the methylolamides are derived are carboxylic acids with 3 to 5 carbon atoms, such as methacrylic, crotonic, fumaric, itaconic, citraconic and especially acrylic acid. The $\alpha:\beta$-ethylenically unsaturated monocarboxylic acids—which are used in the form of their water-soluble alkaline earth metal salts—are carboxylic acids containing 3 to 4 carbon atoms, such as methacrylic or crotonic acid and especially, also in this case, acrylic acid.

Insofar as their methylolamide group is concerned the N-methylolamides or their ethers of the acrylic acid series correspond to the general formula (1) 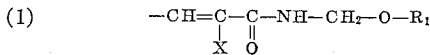

where X represents the methyl group or preferably a hydrogen atom and $R_1$ stands for a hydrogen atom, or an alkyl such as methyl, ethyl, propyl, isopropyl or n-butyl group, or an alkylene such as an allyl group, or a cycloalkyl such as a cyclohexyl group. $R_1$ represents above all a hydrogen atom, and in the case of the ethers $R_1$ is preferably an alkyl group with 1 to 4 carbon atoms. As relevant examples there may be mentioned: N-methylolacrylamide, N-methylolmethacrylamide, methyl ethers and ethyl ethers of N-methylolacrylamide or methacrylamide and N:N'-methylolfumaric acid diamide.

As comonomers that can be polymerised by the present process with the methylolamides of the Formula 1 and the alkaline earth metal salts of the acrylic acid series there are suitable other compounds that are free from N-methylol groups and alkaline earth metal atoms and contain a copolymerisable vinylene group —CH=CH—, preferably with a vinyl group $CH_2$=CH—. There may be mentioned, more especially, esters and amides of $\alpha:\beta$-ethylenically unsaturated monocarboxylic and dicarboxylic acids with 3 to 5 carbon atoms, such as those of acrylic, methacrylic, crotonic, fumaric and itaconic acid. In the case of esters of these acids they are derived from an alkanol with 1 to 18 carbon atoms, for example ethyl acrylate, methyl methacrylate, n-butyl acrylate, 2-ethylhexylacrylatedodecyl acrylate and octadecyl acrylate. Suitable amides are acrylamide and N-monoalkyl-substituted or N:N-dialkyl-substituted amides such as N-n-butyl acrylamide, N-tertiary butyl acrylamide and N:N-diethyl acrylamide. Furthermore, the copolymerisation may be performed with acrylonitrile and also acrylic, crotonic or methacrylic acid when these acids are used in a proportion as a rule not exceeding 1 percent. Likewise suitable are vinyl halides such as vinyl chloride and particularly vinylidene chloride, vinyl esters such as vinyl formate, acetate and butyrate, as well as vinylaryl compounds above all styrene. Finally, there may also be mentioned basic amides or esters of the acrylic acid series that contain a tertiary amino group, such as N:N-dimethylaminoethyl acrylamide, N:N-diethylaminopropyl acrylamide, N:N-dimethyl- or N:N-diethyl-aminopropyl acrylic acid esters. The corresponding quaternated bases are likewise suitable for copolymerisation, for example N:N-diethylaminopropyl acrylamide quaternated with chloracetamide or with chloracetic acid. Preferred comonomers are methyl and n-butyl acrylate, vinylidene chloride, N-tertiary butyl acrylamide, vinyl acetate, acrylonitrile, styrene and N:N-diethylaminopropyl acrylamide. If desired, two or more than two of these monomers may be used. Especially suitable are mixtures consisting of 80 to 90 parts of n-butylacrylate and 20 to 10 parts of vinylidene-chloride, and mixtures containing 65 to 75 parts of 2-ethylhexylacrylate and 35 to 25 parts of acrylonitrile.

The aqueous emulsion polymerisation according to this invention is carried out in the presence of an alkaline earth metal salt of the acrylic acid series. Suitable alkaline earth metal salts are the salts of beryllium, magnesium, calcuim, strontium and barium; it is of advantage to give preference to the calcium salts. It has proved particularly advantageous to use calcium acrylate. When the emulsion polymerisation is conducted in the presence of an alkali metal salt—for example sodium acrylate—no stable dispersion is obtained. The proportion of alkaline earth metal salt to be used can be determined by simple preliminary experiments. According to the invention a minor proportion of the alkaline earth metal salt is used, that is to say 0.25 to 10%, preferably 1 to 5%, of alkaline earth metal salt, taking the total amount of the monomers as 100% by weight. When an amount of more than 15% of an N-methylolamide compound (or of an ether thereof) is used, the requisite amount of alkaline earth metal salt rises correspondingly above 5%. Accordingly, the new copolymers are composed of the following shares of the individual monomers (in % by weight):

(a) 0.25–10%, preferably 1–5%, of an alkaline earth metal salt of an $a:\beta$-unsaturated monocarboxylic acid,
(b) 0.25–30%, preferably 1–15%, of an N-methylolamide or N-methylolamide ether of an $a:\beta$-unsaturated monocarboxylic or dicarboxylic acid,
(c) 99.5–60%, preferably 98–85%, of at least one further copolymerisable compound.

In other respects the starting materials must be constituted so that in an aqueous phase an emulsion polymer is formed.

The incorporation by polymerisation of an alkaline earth metal salt in a copolymer of the kind defined above, which contains N-methylolamide groups, has, as mentioned above, the advantage that premature cross-linking of the methylolamide groups with gelatinisation is prevented and that—more especially when the emulsions are used as coating or impregnating agents—the substrate does not turn yellow. It may also be assumed that by virtue of their bifunctionality of the alkaline earth metal salts act as bridge members between the polymer chains resulting from linear addition. However minor this preliminary cross-linking, it enhances the stability towards solvents of the copolymers after they have undergone cross-linking and have turned insoluble by curing.

The polymerisation is carried out in the usual manner in water at temperatures ranging from 20 to 90° C., preferably from 30 to 75° C., and with the use of anionic, non-ionic, cationic or amphoteric emulsifiers. As non-ionic emulsifiers there are suitable reaction products of ethylene oxide with compounds containing an active hydrogen atom, for example amines or long-chain alcohols or fatty acids or aromatic hydroxyl compounds. Suitable anionic emulsifiers are alkyl sulphates, alkyl sulphonates and aralkyl sulphonates. Alternatively, the procedure may consist in adding under the polymerisation conditions to a previously formed emulsion polymer that has been prepared in the presence of, for example, calcium acrylate, a separately prepared emulsion polymer obtained without using calcium acrylate.

As catalysts there may be used water-soluble catalysts that supply free radicals, such as potassium persulphate or hydrogen peroxide.

The stable emulsions obtained by the present process constitute hard or soft copolymers depending on the starting materials chosen; in most cases the final product is a latex. These new products are suitable for a wide variety of uses, for example as coating and dressing agents for non-porous substrates such as wood or metal and also for foils or webs of plastic materials, for example of polyethylene, polyesters or polyamide, and above all as coating agents for paper and cardboard. The emulsion polymers are further suitable for use as dressing agents for fabric-like materials, more especially fabrics woven from a polyamide, polyacrylonitrile or polyester fibres. Finally, there may be mentioned their suitability for use as impregnating agents for porous substrates, such as textiles; in this sphere they are used with special advantage in admixture with known synthetic resins, such as urea resins or other aminoplasts, for improving cotton. In the leather industry the emulsions may be used for producing unbreakable dressings that are fast to acetone and hot ironing.

Coatings and impregnations produced with the emulsion polymers manufactured by the present process are distinguished by their remarkable fastness to washing, abrasion resistance and soft handle. Particularly striking is their fastness to dry-cleaning agents (trichloroethylene). When the copolymers are used in combination with aminoplasts on cotton fabrics, the tear strength and decrease angle of the fabrics are increased. To render the emulsion polymers—especially those manufactured with incorporation of vinylidene chloride—fast to solvents, it is as a rule surprisingly sufficient to heat at a temperature within the range from 15 to 50° C. When drying is performed at 60 to 150° C., the cross-linking reaction, which gives rise to the insoluble products, is triggered off sooner. For this purpose it is not really necessary to add a curing agent, though in some cases such an addition helps. As such curing agents there may be used acids or acid donors, for example hydrochloric acid or phosphoric acid or ammonium chloride.

The emulsions manufactured according to this invention may be admixed with dyestuffs (pigments), softening agents or other modifying agents. When a pigment is added, a valuable printing paste is obtained.

Parts and percentages in the following examples are by weight.

Example 1

15 parts of sodium laurylsulphate and 15 parts of sodium $\alpha$-hydroxyoctadecane sulphonate are dissolved in 900 parts of deionised water by being stirred at about 30 to 35° C. in a reactor equipped with stirrer, reflux condenser and thermometer. The air in the apparatus is then displaced by means of nitrogen, and the batch is once more cooled to 20 to 25° C. 11.3 parts of calcium acrylate (1.5%), 50 parts of an aqueous solution of 60% strength of N-methylolacrylamide (4%), 578 parts of n-butyl acrylate (80.5%) and 101 parts of vinylidene chloride (14%) are then added to the solution, and the whole is heated with gentle stirring to an internal temperature of 50° C. The mixture prepared in this manner has a pH value of 5 to 6. At 50° C., a solution of 0.35 part of sodium bisulphite in 3.5 parts of deionised water is then added, followed by a solution of 0.7 part of potassium persulphate in 14 parts of deionised water. The polymerisation, which sets in immediately, is controlled by occasional cooling so that the temperature does not rise above 75° C. When the temperature has reached its maximum, the polymerisation is finalised by heating the batch for 4 to 5 hours at about 70 to 75° C., and after about half the reaction time has elapsed another solution of 0.7 part of potassium persulphate in 14 parts of deionised water is added. After the batch has cooled, it forms a substantially pure emulsion of a thickly syrupy consistency, having a solids content of 43%. The yield of polymer amounts to 94 to 95% of the theoretical.

The emulsion has a pH value of 5.7 and is still stable after having been stored for 10 weeks at 60° C. It shows no signs of yellowing. A film obtained by drying the emulsion on a plate of glass at room temperature is soft and elastic and yet very little tacky. The resin is completely insoluble in boiling trichloroethylene without application of heat or catalytic curing. When dilute hydrochloric acid is added to establish a pH value of 3, and the product is cured for 5 minutes at 140° C., the stability to trichloroethylene is distinctly improved.

The latex can be admixed with silicon dioxide to an extent of up to 10%, calculated on the resin content; even such a mixture is still stable after having been stored for one week at 60° C.

Example 2

4 parts of sodium phenyldodecylsulphonate and 4 parts of sodium laurylsulphate are dissolved with moderate heating in 184 parts of deionised water, and to this solution there are added 2 parts of an aqueous solution of calcium acrylate of 25.3% strength (0.25%), 1.8 parts of an aqueous solution of 56% strength of N-methylolacrylamide (0.5%), 16 parts of methylacrylate (8%) and 182.5 parts of vinylidene chloride (91.25%). The mixture is heated with stirring to 33° C. in a stirring flask of 500 ml. capacity (which has previously been scavenged with nitrogen), and a solution of 0.1 part of sodium bisulphite in 1 part of water and a solution of 0.2 part of ammonium persulphate in 2 parts of water are added. After 2 hours, another solution of 0.2 part of ammonium persulphate in 2 parts of water is added, and the batch is polymerised for another 8 hours, with the temperature gradually rising to about 40° C.

Yield: 353 parts of a thinly viscous, stable, pure emulsion having a solids content of 47.3%. The yield of polymer amounts to about 92% of the theoretical. The pH value is 4.8.

Example 3

2 parts of sodium phenyldodecylsulphonate and 2 parts of sodium laurylsulphate are dissolved in 682.2 grams of water, and 31.6 parts of a calcium acrylate solution of 25.3% strength (10%), 21.4 parts of an N-methylolacrylamide solution of 56% strength (15%), 6.4 parts of methylacrylate (8%) and 53.5 parts of vinylidene chloride (67%) are added. The mixture is polymerised in a stirring flask as described in Example 2.

Yield. 780 parts of a stable, thinly syrupy emulsion which is substantially pure and has a solids content of 10.3%. The yield of polymer amounts to about 95% of the theoretical. The pH value is 5.7.

Example 4

3 parts of sodium hydroxyoctadecanesulphonate and 1.5 parts of sodium laurylsulphate are dissolved at about 30 to 35° C. in 140 parts of deionised water in a reactor equipped with stirrer, reflux condenser and thermometer. After having displaced the air in the apparatus with nitrogen, the mixture is once again cooled to 20 to 25° C. and the following successive additions are made: 0.2 part of potassium persulphate, 1.5 part of calcium acrylate (1%), 6 parts of methylolmethacrylamide (4%), 97.5 parts of n-butyl acrylate (65%) and 45 parts of vinylidene chloride (30%), and the batch is heated to an internal temperature of 35° C. while being stirred. The mixture prepared in this manner has a pH value of about 5. A solution of 0.1 part of sodium bisulphite in 1 part of water is then added at 35° C. The batch undergoes polymerisation which is noticeable by the temperature rising slowly to a maximum of 46° C. and is finalised by heating for a total of about 20 hours at an internal temperature of about 40 to 45° C. On cooling, a substantially pure emulsion of creamy consistency is obtained, which has a solids content of 50%. The yield of polymer amounts to 93 to 94% of the theoretical. The pH value is 5.2. The emulsion is stable for 72 hours at 60° C. and shows no signs of yellowing.

When the experiment described above is repeated without addition of calcium acrylate, the batch gelatinises after only 2½ hours' polymerisation.

Example 5

When the methylolmethacrylamide used in Example 4 is replaced by an equal weight of methylolacrylamide methyl ester, and otherwise the same conditions as in Example 4 are used, there results a substantially pure emulsion of syrupy consistency having a solids content of 51.2%, and the yield of polymer amounts to 95 to 96% of the theoretical. The pH value is 5.5. After having been stored for 15 days at 60° C., the emulsion is still stable and shows no signs of yellowing.

An identical experiment, except with omission of calcium acrylate, proceeds with evolution of much heat (up to a maximum of 73° C.) inspite of ice cooling, and the batch undergoes partial gelatination during the polymerisation.

Example 6

When the experiment described in Example 4 is repeated, but the methylolmethacrylamide is replaced by an equal weight of methylolacrylamide allyl ether, a substantially pure, thinly syrupy emulsion is obtained which has a solids content of 51%; the yield of polymer is 97 to 98% of the thoretical. The pH value is 5.6. After having been stored for 5 days at 60° C., the emulsion is still stable and shows no signs of yellowing.

When the experiment described is repeated, but without addition of calcium acrylate, the polymer yield is only 71%, and the shelf life at 60° C. is not up to that of the product prepared as described above with additon of calcium acrylate.

Example 7

1.75 parts of sodium laurylsulphate are dissolved at about 30 to 35° C. in 100 parts of deionised water in a reactor equipped with stirrer, reflux condenser, thermometer and a closed, stirrable dropping vessel. The air in the apparatus is expelled with nitrogen, the batch is cooled to 20 to 25° C, and there are then successively added: 3 parts of calcium acrylate (2%), 3.75 parts of an aqueous solution of methylolacrylamide of 60% strength (1.5%) and 110 parts of n-butyl acrylate (74%), and the batch is heated with stirring to an internal temperature of 55° C. The resulting mixture has a pH value of about 6. At 35° C. there are then added a solution of 0.2 part of potassium persulphate in 4 parts of water and a solution of 0.1 part of sodium bisulphite in 1 part of water. The polymerisation takes a rather exothermic course and requires periodic cooling to maintain the polymerisation temperature at a maximum of 85° C. When the reaction temperature begins to drop again, the heating bath is removed and polymerisation is continued until the internal temperature has dropped again to its initial level of about 55° C. The batch is then heated again to maintain the temperature at about 55° C., and in the course of about ½ hour an emulsion previously prepared from 33 parts of vinylidene chloride (22%), 3.75 parts of an aqueous methylolacrylamide solution of 60% strength (1.5%), 0.5 part of sodium laurylsulphate, 0.5 part of sodium α-hydroxyoctadecanesulphonate and 33 parts of deionised water is then added dropwise. 45 minutes after all of this emulsion has been dropped in, another solution of 0.2 part of potassium persulphate in 4 parts of water is added, and polymerisation is continued for another 7 hours at about 55° C. On cooling, there is obtained a substantially pure, almost odourless emulsion of syrupy consistency which has a solid content of 47 to 48%. The yield of polymer amounts to 92% of the theoretical. The pH value is 5.5. The latex remains stable for 10 days at 60° C. and shows no signs of yellowing. In addition, the emulsion is extremely stable towards mechanical stresses. It lends itself very well to mixing with silicon dioxide. A film obtained by drying this latex at room temperature is soft and elastic and yet very fast to trichloroethylene; this fastness can be increased by adding dilute hydrochloric acid to a pH value of about 2. The fastness to trichloroethylene can also be improved by heating for a short time at 80° C., with or without addition of acid.

The emulsion is adjusted with hydrochloric acid of 10% strength to pH=3 and then used as a dressing agent for nylon fabric in the folowing manner: A nylon fabric is coated with this emulsion twice on a doctor finishing machine with an air scraper with intermediate drying and then hardened for 5 minutes at 140° C. (Weight of coating: about 20 to 25 g. of resin per square metre of nylon fabric.)

The finished nylon fabric has a soft, dry handle and displays good fastness to trichloroethylene.

The Heermann test (water head in cm.) yields the following data:

(a) 145 cm. (maximum: 150 cm.) before the treatment with trichloroethylene;
(b) 112 cm. (maximum: 150 cm.) after the treatment with trichloroethylene.

Example 8

5 parts of an emulsifier (prepared by esterifying a condensation product of a higher amine with 80 molecular proportions of ethylene oxide with sulphamic acid with addition of urea) and 2 parts of a condensation product of nonylphenol with 9 molecular proportions of ethylene oxide are dissolved in 145 parts of deionised water. 3 parts of calcium acrylate (3%) are then dissolved in the emulsifier solution prepared in this manner, and 5 parts of N-methylolacrylamide in the form of an aqueous solution of 60% strength (3%), and 94 parts of vinyl acetate (94%) are then added. The mixture is homogenised at room temperature, and one half of this pre-emulsion is heated in a ½-litre stirring vessel under nitrogen to 50° C.; this stirring vessel is equipped with reflux condenser, thermometer and a stirrable dropping vessel. At an internal temperature of 50° C. a solution of 0.1 part of sodium metabisulphite in 1 part of water as well as a solution of 0.14 part of potassium persulphate in 3 parts of water are added. After about 10 minutes, the remainder of the pre-emulsion is dropped in within about 30 minutes. After every 10 minutes another solution of 0.07 part of potassium persulphate in 1.5 parts of water is added. When all has been dropped in, another solution of 0.07 part of potassium persulphate in 1.5 parts of water, as well as 0.1 part of sodium metabisulphite in 1 part of water are added, during which the temperature rises slightly to about 56° C. To complete the polymerisation, the batch is heated for 16 hours longer at about 52 to 54° C., while making after completion of the dropwise addition, at intervals of 30 minutes each, 5 further additions of 0.07 part of potassium persulphate in 1.5 parts of water.

Yield: 268 parts of a thinly viscous, pure emulsion having a solids content of 39.7%. Yield of polymer: 98.5% of the theoretical. The emulsion remains stable for 17 days at 60° C.

An experiment conducted in identical manner with 97 parts of vinyl acetate and 5 parts of N-methylolacrylamide of 60% strength, but in the absence of calcium acrylate, displays a strong formation of granular material even during the polymerisation, and the resulting polymer precipitates quantitatively in the form of a suspension.

Example 9

A solution of 2.5 parts of sodium dodecylphenylsulphonate and 2.5 parts of sodium laurylsulphate in 145 parts of deionised water is mixed with 3 parts of calcium acrylate (3%). There are then added 3.34 parts of methylolacrylamide in the form of an aqueous solution of 60% strength (2%) as well as 95 parts of styrene (95%). The mixture is homogenised at room temperature, and one half of it is heated to an internal temperature of 40° C. in the apparatus described in Example 8. There are then added a solution of 0.1 part of sodium metabisulphite in 1 part of water, and a solution of 0.14 part of potassium persulphate, with the temperature rising by 5° C. In the course of 20 minutes the remainder of the pre-emulsion is dropped in. On completion of the dropwise addition another solution of 0.1 part of sodium metabisulphite in 1 part of water, and a solution of 0.07 part of potassium persulphate in 1.5 parts of water are added, with the temperature rising to 57° C. The polymerisation is finalised by heating for another 18 minutes at about 50 to 55° C.; after completion of the dropwise addition, at intervals of 30 minutes each, another 7 additions are made of a solution of 0.07 part of potassium persulphate in 1.5 parts of water.

Yield: 267 parts of a thinly viscous, pure emulsion having a solids content of 39.1%. Yield of polymer: 98% of the theoretical.

After having been stored for 13 days at 60° C., the emulsion was still stable.

An experiment performed in identical manner with 98 parts of styrene and 3.34 parts of an N-methylolacrylamide solution of 60% strength, but without adding calcium acrylate, resulted in complete coagulation even in the course of the polymerisation.

Example 10

A solution of 2.4 parts of sodium phenyldodecylsulphonate and 2.4 parts of sodium laurylsulphate in 197 parts of water is mixed with 24 parts of a solution of calcium crotonate of 10% strength (1.5%), 8.0 parts of an N-methylolacrylamide solution of 56% strength (3%), 112.8 parts of vinylidene chloride (70.5%) and 40.0 parts of vinyl acetate (25%). The mixture is heated to 50° C. in a stirring flask of ½ litre capacity, whereupon a solution of 0.1 part of sodium bisulphite in 1 part of water and a solution of 0.2 part of potassium persulphate in 4 parts of water are added. At intervals of 2 hours each another 2 additions of an identical solution of potassium persulphate are made, and after another 2 hours the batch is cooled to room temperature.

Yield: 397 parts of a thinly syrupy, stable and pure emulsion having a solids content of 36%. Yield of polymer: 86 to 87% of the theoretical. The pH value is 5.2.

Example 11

A solution of 2.4 parts of sodium phenyldodecylsulphonate and 2.4 parts of sodium laurylsulphate in 247 parts of water is mixed with 30.0 parts of a magnesium acrylate solution of 16% strength (1.5%), 6.4 parts of an N-methylolacrylamide solution of 56% strength (3%), 102 parts of vinylidene chloride (85%) and 9.6 parts of lauryl acrylate (8%).

The mixture is polymerized for a total of 14 hours by the method described in Example 10. There are obtained 382 grams of a pure, thinly syrupy emulsion having a dry content of 28.6%. The yield of polymer is about 87% of the theoretical yield. The pH is 5.5. Six weeks later, the emulsion is still of unchanged stability.

Example 12

A solution of 2.4 parts of sodium phenyldodecylsulphonate and 2.4 parts of sodium laurylsulphate in 218 parts of water is mixed with 2.4 parts of barium acrylate (1.5%), 8.0 parts of an N-methylolacrylamide solution of 56% strength (3%), 112.8 parts of vinyl acetate (70.5%) and 40 parts of N-tertiary butyl acrylamide (25%).

The mixture is polymerised as described in Example 10, stirred until cold and then diluted with 150 parts of water, to yield 551 parts of a thickly creamy emulsion having a solids content of 30.0%. Polymer yield: about 100% of the theoretical. The pH value is 4.8. After having been stored for 6 weeks, the emulsion was still stable.

Example 13

A solution of 5.0 parts of a reaction product from 1 molecular proportion of hydroabietyl alcohol and 30 molecular proportions of ethylene oxide in 309 parts of water is mixed with 7.75 parts of a solution of calcium acrylate of 25.9% strength (2%), 5.35 parts of an N-methylolacrylamide solution of 56% strength (3%), 10 parts of N:N-diethylaminopropyl acrylamide (10%), 60 parts of 2-ethylhexyl acrylate (60%) and 25 parts of vinylidene chloride (25%). The mixture is introduced into a ½-litre stirring flask and during 15 minutes carbon dioxide is passed through it at room temperature. The current of carbon dioxide is then reduced and the batch is heated to an internal temperature of 50° C., whereupon a solution of 0.1 part of sodium bisulphite in 1 part of water and a solution of 0.3 part of potassium persulphate in 6 parts of water are added. The temperature rises gradually to about 70° C. and then drops again slowly. After about 1½ hours the batch is heated to about 75° C. and polymerisation at this temperature is continued for 1½ hours. The whole is then cooled to room temperature.

Yield: 429 parts of a syrupy emulsion having a solids content of 22.75%. Yield of polymer: 92–93% of the theoretical. The pH value is 8.2.

Example 14

A solution of 6 parts of lauroylamidopropyl trimethyl ammonium methosulphate in 253 parts of water is mixed with 7.1 parts of a solution of calcium acrylate of 25.9% strength (1.5%), 6.4 parts of a solution of N-methylolacrylamide of 56% strength (3%), 12 parts of an aqueous solution of 50% strength of N:N-diethylaminopropyl acrylamide quaternated with chloracetamide (5%), 78.6 parts of vinyl acetate (65.5%) and 30.0 parts of vinylidene chloride (25%). The mixture is heated to 50° C. in a ½-litre stirring flask, and a solution of 0.1 part of sodium bisulphite in 1 part of water, and a solution of 0.3 part of ammonium persulphate in 3 parts of water are added. After 2 hours another solution of 0.3 part of ammonium persulphate in 3 parts of water is added; after another 2 hours the batch is heated to about 70° C. and polymerised for 1 hour longer at this temperature, whereupon the whole is cooled.

Yield: 395 parts of an emulsion of salve-like consistency having a solids content of 30.8%. Yield of polymer: 96 to 97% of the theoretical. The pH value is 4.4.

The emulsion is still stable after one month's storing.

333 g. of the emulsion described above (solids content about 30%) are diluted with water to make 1 litre, and 5 g. of ammonium chloride are added. A cotton fabric and a nylon tricot fabric are immersed, padded and dried on a stenter at 80° C., then cured for 4½ minutes at 160° C. Both fabrics, in the unwashed state, display a very strong stiffening effect (maximal rating: 5), and, after 3 SNV–4 washes in the case of cotton and 3 SNV–1 washes in the case of the nylon tricot, the stiffening effect obtained is still equal to the rating 3.

*Example 15*

A solution of 2.5 parts of sodium phenyldodecylsulphonate and 2.5 parts of sodium laurylsulphate in 154 parts of water is mixed with 1.0 part of calcium acrylate (1%), 5.0 g. of an N-methylolacrylamide solution of 60% strength (3%), 26 parts of acrylonitrile (26%), 70 parts of 2-ethylhexyl acrylate (70%) and 0.5 part of ammonium persulphate. The mixture is heated to 50° C. in a ½-litre stirring flask, and a solution of 0.1 part of sodium metabisulphite in 5 parts of water is added. After about 1 hour a solution of 0.3 part of ammonium persulphate in 5 parts of water is added, and the batch is polymerised for a further 3 hours at 60 to 65° C. and then cooled to room temperature.

Yield: 267 parts of a pure emulsion of salve-like consistency, having a solids content of 36.2%; polymer yield about 97%. The pH value is 4.85. The emulsion was found to be stable even after about 6 months' storing. 20 ml. of an ammonium chloride solution of 25% strength for every kg. of the emulsion described above are then added. A fabric of any desired kind is then coated with the emulsion on a special finishing machine with the use of cylinders and the fabric thus coated is then further coated with a foamed material, preferably with foamed polyurethane. The weight of the emulsion coating ranges from 40 to 60 g. per square metre. The coated material is then dried in a hot air channel or on cylinders and then cured for 5 minutes at 150° C. The coatings produced in this manner withstand several washes up to stage SNV–2 and are stable towards dry cleaning (with trichloroethylene).

*Example 16*

A solution of 24 parts of sodium phenyldodecylsulphonate and 24 parts of sodium laurylsulphate in 2555 parts of water is mixed with 190 parts of a solution of calcium acrylate of 25.3% strength (4%), 64 parts of an N-methylolacrylamide solution of 56% strength (3%), 96 parts of methylacrylate (8%) and 1020 parts of vinylidene chloride (85%).

The mixture is heated to about 30° C. in a 5-litre stirring flask and a solution of 0.5 g. of sodium bisulphite in 5 g. of water, and a solution of 2 g. of ammonium persulphate in 20 g. of water are added. The temperature rises within 5 to 6 hours slowly to about 46° C.; when it rises no longer, another solution of 0.5 g. of sodium bisulphite in 5 g. of water, as well as a solution of 2 g. of ammonium persulphate in 20 g. of water are added; the whole is heated for 30 minutes at about 60° C. and polymerisation at this temperature is continued for another 5 hours, whereupon the batch is cooled to room temperature, to yield 3980 parts of a thinly liquid, pure emulsion which is still completely stable after 2 months' storing. Its solids content is 30.8%. The yield of polymer amounts to about 98% of the theoretical. The pH value is 5.15.

Paper suitable for coating, consisting of 80% of bleached sulphite cellulose, 20% of birch cellulose, 15% of kaolin, 0.5% of resin size and 2% of aluminium sulphate is coated on a coating machine three times on one side with the emulsion described above, to which previously 5% of ammonium chloride (calculated on the resin content of 30.8%) have been added. After each passage the paper is dried for 30 seconds at about 130° C. The working speed of the machine is 1.8 metres per minute. Examination of the paper reveals the following data (the figures in parentheses refer to the untreated paper):

| | |
|---|---|
| Coating weight, g./sq. m. | 8.0 (nil) |
| Coating weight, in percent | 13.8 (nil) |
| Weight of original paper, g./sq. m. | 96 (83) |
| Breaking load, in kg. | 6.880 (5.920) |
| Stretch, in percent | 2.8 (2.2) |
| Tear length, in m. | 4390 (4500) |
| Cross tear strength, in g. | 31 (12.8) |
| Bursting pressure, in kg./sq. cm. | 2.485 (2.192) |
| Folding endurance, folds | 178 (1.81) |
| Permeability to air, in cc./sec.: | |
| Felt side | 0.001 (0.49) |
| Fourdrinier side | 0.077 (0.515) |
| Permeability to steam, in g. of water per sq. m. of paper, per day: | |
| (a) Average value of unfolded paper at 65% moisture drop within 10 days | 15 (778) |
| (b) Average value of cross-folded paper, at 65% moisture drop within 10 days | 24 (825) |

Permeability to grease (measured by the Tappi Standard Method T–454, but with mineral oil instead of oil of turpentine):

Result obtained with untreated paper, folded and unfolded, after 5 seconds: All 4 specimens were permeable to the oil.

Result obtained with the treated paper (unfolded) after 60 minutes: All 4 specimens tested were still impermeable to the oil.

*Example 17*

A solution of 2.4 parts of sodium phenyldodecylsulphonate and 2.4 parts of sodium laurylsulphate in 254 parts of water is mixed with 7.4 parts of an aqueous solution of strontium acrylate of 24.4% strength (1.5%), 6.0 parts of an aqueous solution of N-methylolacrylamide of 60% strength (3%), 84.6 parts of vinyl acetate (70.5%) and 30.0 parts of vinylidene chloride (25%). The mixture is then polymerised as described in Example 12.

Yield: 395 parts of a syrupy emulsion having a solids content of 26.4%. The pH value is 5.0.

*Example 18*

250 g. of an aqueous emulsion 40% strength of a copolymer from 90% vinyl acetate, 8% of methylolacrylamide methyl ether and 2% of calcium acrylate, 5 g. of ammonium nitrate or 10 g. of anhydrous zinc chloride and 150 g. of an aqueous solution of 50% strength of a mixture of 1 part of dimethylolethylene urea and 1 part of hexamethylolmelamine hexamethyl ether are made up with water to 1 litre. A cotton fabric is impregnated with this solution and expressed to a weight increase of 70%, dried on a stenter at 80° C. and then cured for 4½ minutes at 155 to 160° C. The treated fabric displays an excellent stiffening effect (maximum rating: 5). The fabric is then subjected to 5 SNV-4 washes in a washing machine, whereupon the rating 4 for the stiffening effect is obtained. The fabric is then chlorinated and scorched according to AATCC. No discoloration is observed, even after 5 SNV-4 washes.

What is claimed is:

1. A linear copolymer of additively combined units of
   (a) 0.25 to 10 percent by weight of an alkaline earth metal salt of an $\alpha:\beta$-monoethylenically unsaturated monocarboxylic acid containing 3 to 4 carbon atoms,
   (b) 0.25 to 30 percent by weight of an amide selected from the group consisting of an N-methylolamide and an N-methylolamide ether derived from an aliphatic alcohol having at most 4 carbon atoms, the acid of said amide being an at most dicarboxylic acid which is $\alpha:\beta$-ethylenically unsaturated and contains 3 to 5 carbon atoms, and
   (c) 99.5 to 60 percent by weight of at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

2. A linear copolymer of additively combined units of
   (a) 0.25 to 10 percent by weight of an alkaline earth metal salt of an $\alpha:\beta$-monoethylenically unsaturated monocarboxylic acid containing 3 to 4 carbon atoms,
   (b) 0.25 to 30 percent by weight of N-methylolamide of an at most dicarboxylic acid which is $\alpha:\beta$-ethylenically unsaturated and contains 3 to 5 carbon atoms, and
   (c) 99.5 to 60 percent by weight of at least one other copolymerizable compound selected from the group consisting of an ester of acrylic acid and an alkanol with 1 to 18 carbon atoms, an N-substituted acrylaminde, a vinylhalide, a vinylidene halide, a vinylester, a vinyl aryl compound and acrylonitrile.

3. A linear copolymer of additively combined units of
   (a) 0.25 to 10 percent by weight of an alkaline earth metal salt of an $\alpha:\beta$-monoethylenically unsaturated monocarboxylic acid containing 3 to 4 carbon atoms,
   (b) 0.25 to 30 percent by weight of an N-methylolamide ether derived from an aliphatic alcohol having at most 4 carbon atoms, the acid of said amide being an at most dicarboxylic acid which is $\alpha:\beta$-ethylenically unsaturted and contains 3 to 5 carbons atoms, and
   (c) 99.5 to 60 percent by weight of at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted arylamide, a vinylhalide, a vinylidene halide, a vinylester, a vinyl aryl compound and acrylonitrile.

4. A linear copolymer of additively combined units of
   (a) 0.25 to 10 percent by weight of an alkaline earth metal salt of an $\alpha:\beta$-monoethylenically unsaturated monocarboxylic acid containing 3 to 4 carbon atoms,
   (b) 0.25 to 30 percent by weight of an N-methylolamide of an $\alpha:\beta$-ethylenically unsaturated monocarboxylic acid which contains 3 to 5 carbon atoms, and
   (c) 99.5 to 60 percent by weight of at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

5. A linear copolymer of additively combined units of
   (a) 0.25 to 10 percent by weight of an alkaline earth metal salt of an $\alpha:\beta$-monoethylenically unsaturated monocarboxylic acid containing 3 to 4 carbon atoms,
   (b) 0.25 to 30 percent by weight of an N-methylolamide of an $\alpha:\beta$-ethylenically unsaturated dicarboxylic acid which contains 3 to 5 carbon atoms, and
   (c) 99.5 to 60 percent by weight of at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

6. A linear copolymer of additively combined units of
   (a) 0.25 to 10 percent by weight of an alkaline earth metal salt of an $\alpha:\beta$-monoethylenically unsaturated monocarboxylic acid containing 3 to 4 carbon atoms,
   (b) 0.25 to 30 percent by weight of an N-methylolamide ether derived from an aliphatic alcohol having at most 4 carbon atoms, the acid of said amide being an $\alpha:\beta$-ethylenically unsaturated monocarboxylic acid which contains 3 to 5 carbon atoms, and
   (c) 99.5 to 60 percent by weight of at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

7. A linear copolymer of additively combined units of
   (a) 0.25 to 10 percent by weight of the calcium salt of an $\alpha:\beta$-monoethylenically unsaturated monocarboxylic acid containing 3 to 4 carbon atoms,
   (b) 0.25 to 30 percent by weight of an amide selected from the group consisting of an N-methylolamide and an N-methylolamide ether derived from aliphatic alcohol having at most 4 carbon atoms, the acid of said amide being an at most dicarboxylic acid which is $\alpha:\beta$-ethylenically unsaturated and contains 3 to 5 carbon atoms, and
   (c) 99.5 to 60 percent by weight of at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound, acrylonitrile.

8. A linear copolymer of additively combined units of 0.25 to 10 percent by weight of calcium acrylate, 0.25 to 30 percent by weight of N-methylolacrylamide and of 99.5 to 60 percent by weight of a mixture consisting of 80 to 90 parts of n-butylacrylate and 20 to 10 parts of vinylidene chloride.

9. A linear copolymer of additively combined units of 0.25 to 10 percent by weight of calcium acrylate, 0.25 to 30 percent by weight of N-methylolacrylamide and of 99.5 to 60 percent by weight of a mixture consisting of 65 to 75 parts of 2-ethylhexylacrylate and 35 to 25 parts of acrylonitrile.

10. A linear copolymer of additively combined units of 0.25 to 10 percent by weight of calcium acrylate, 0.25 to 30 percent by weight of N-methylolacrylamidemethylether and of 99.5 to 60 percent by weight of vinylacetate.

11. A stable aqueous emulsion containing a linear copolymer of additively combined units of
   (a) 0.25 to 10 percent by weight of an alkaline earth metal salt of an $\alpha:\beta$-monoethylenically unsaturated monocarboxylic acid containing 3 to 4 carbon atoms,
   (b) 0.25 to 30 percent by weight of an amide selected from the group consisting of an N-methylolamide and an N-methylolamide ether derived from an aliphatic alcohol having at most 4 carbon atoms, the acid of said amide being an at most dicarboxylic acid which is $\alpha{:}\beta$-ethylenically unsaturated and contains 3 to 5 carbon atoms, and
(c) 99.5 to 60 percent by weight of at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

12. A linear copolymer of additively combined units of
(a) 0.25 to 10 percent by weight of an alkaline earth metal salt of an $\alpha{:}\beta$-monoethylenically unsaturated monocarboxylic acid containing 3 to 4 carbon atoms,
(b) 0.25 to 30 percent by weight of an amide selected from the group consisting of an N-methylolamide and an N-methylolamide ether derived from an aliphatic alcohol having at most 4 carbon atoms, the acid of said amide being an at most dicarboxylic acid which is $\alpha{:}\beta$-ethylenically unsaturated and contains 3 to 5 carbon atoms, and
(c) 99.5 to 60 percent by weight of a mixture of copolymerizable compounds, said mixture consisting of acrylic acid in a proportion not exceeding 1 percent and at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

13. A linear copolymer of additively combined units of
(a) 0.25 to 10 percent by weight of an alkaline earth metal salt of an $\alpha{:}\beta$-monoethylenically unsaturated monocarboxylic acid containing 3 to 4 carbon atoms,
(b) 0.25 to 30 percent by weight of N-methylolamide of an at most dicarboxylic acid which is $\alpha{:}\beta$-ethylenically unsaturated and contains 3 to 5 carbon atoms, and
(c) 99.5 to 60 percent by weight of a mixture of copolymerizable compounds, said mixture consisting of acrylic acid in a proportion not exceeding 1 percent and at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

14. A linear copolymer of additively combined units of
(a) 0.25 to 10 percent by weight of an alkaline earth metal salt of an $\alpha{:}\beta$-monoethylenically unsaturated monocarboxylic acid containing 3 to 4 carbon atoms,
(b) 0.25 to 30 percent by weight of an N-methylolamide ether derived from an aliphatic alcohol having at most 4 carbon atoms, the acid of said amide being an at most dicarboxylic acid which is $\alpha{:}\beta$-ethylenically unsaturated and contains 3 to 5 carbon atoms, and
(c) 99.5 to 60 percent by weight of a mixture of copolymerizable compounds, said mixture consisting of acrylic acid in a proportion not exceeding 1 percent and at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

15. A linear copolymer of additively combined units of
(a) 0.25 to 10 percent by weight of an alkaline earth metal salt of an $\alpha{:}\beta$-monoethylenically unsaturated monocarboxylic acid containing 3 to 4 carbon atoms,
(b) 0.25 to 30 percent by weight of an N-methylolamide of an $\alpha{:}\beta$-ethylenically unsaturated monocarboxylic acid which contains 3 to 5 carbon atoms, and
(c) 99.5 to 60 percent by weight of a mixture of copolymerizable compounds, said mixture consisting of acrylic acid in a proportion not exceeding 1 percent and at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

16. A linear copolymer of additively combined units of
(a) 0.25 to 10 percent by weight of an alkaline earth metal salt of an $\alpha{:}\beta$-monoethylenically unsaturated monocarboxylic acid containing 3 to 4 carbon atoms,
(b) 0.25 to 30 percent by weight of an N-methylolamide of an $\alpha{:}\beta$-ethylenically unsaturated dicarboxylic acid which contains 3 to 5 carbon atoms, and
(c) 99.5 to 60 percent by weight of a mixture of copolymerizable compounds, said mixture consisting of acrylic acid in a proportion not exceeding 1 percent and at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

17. A linear copolymer of additively combined units of
(a) 0.25 to 10 percent by weight of an alkaline earth metal salt of an $\alpha{:}\beta$-monoethylenically unsaturated monocarboxylic acid containing 3 to 4 carbon atoms,
(b) 0.25 to 30 percent by weight of an N-methylolamide ether derived from an aliphatic alcohol having at most 4 carbon atoms, the acid of said amide being an $\alpha{:}\beta$-ethylenically unsaturated monocarboxylic acid which contains 3 to 5 carbon atoms, and
(c) 99.5 to 60 percent by weight of a mixture of copolymerizable compounds, said mixture consisting of acrylic acid in a proportion not exceeding 1 percent and at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

18. A linear copolymer of additively combined units of
(a) 0.25 to 10 percent by weight of the calcium salt of an $\alpha{:}\beta$-monoethylenically unsaturated monocarboxylic acid containing 3 to 4 carbon atoms,
(b) 0.25 to 30 percent by weight of an amide selected from the group consisting of an N-methylolamide and an N-methylolamide ether derived from aliphatic alcohol having at most 4 carbon atoms, the acid of said amide being an at most dicarboxylic acid which is $\alpha{:}\beta$-ethylenically unsaturated and contains 3 to 5 carbon atoms, and
(c) 99.5 to 60 percent by weight of a mixture of copolymerizable compounds, said mixture consisting of acrylic acid in a proportion not exceeding 1 percent and at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

19. A stable aqueous emulsion containing a linear copolymer of additively combined units of
- (a) 0.25 to 10 percent by weight of an alkaline earth metal salt of an $\alpha$:$\beta$-monoethylenically unsaturated monocarboxylic acid containing 3 to 4 carbon atoms,
- (b) 0.25 to 30 percent by weight of an amide selected from the group consisting of an N-methylolamide and an N-methylolamide ether derived from an aliphatic alcohol having at most 4 carbon atoms, the acid of said amide being an at most dicarboxylic acid which is $\alpha$:$\beta$-ethylenically unsaturated and contains 3 to 5 carbon atoms, and
- (c) 99.5 to 60 percent by weight of a mixture of copolymerizable compounds, said mixture consisting of acrylic acid in a proportion not exceeding 1 percent and at least one other copolymerizable compound selected from the group consisting of an ester of acrylic acid and an alkanol with 1 to 18 carbon atoms, an ester of methacrylic acid and an alkanol with 1 to 18 carbon atoms, an N-substituted acrylamide, a vinylhalide, a vinylidene halide, a vinylester, a vinyl aryl compound and acrylonitrile.

References Cited by the Examiner

UNITED STATES PATENTS

| | | | |
|---|---|---|---|
| 2,865,177 | 12/1958 | Gnaedinger | 260—29.6 |
| 2,984,588 | 5/1961 | Graulich et al. | 260—29.6 |

MURRAY TILLMAN, *Primary Examiner.*

SAMUEL H. BLECH, *Examiner.*

W. J. BRIGGS, SR., *Assistant Examiner.*